(12) United States Patent
Hrybyk et al.

(10) Patent No.: US 9,479,373 B2
(45) Date of Patent: Oct. 25, 2016

(54) PACKET PROCESSOR VERIFICATION METHODS AND SYSTEMS

(71) Applicant: Lockheed Martin Corporation, Bethesda, MD (US)

(72) Inventors: Alexander Gregory Hrybyk, Millersville, MD (US); Kwok Lee Tang, Ellicott City, MD (US); Michael Panczenko, Ellicott City, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 338 days.

(21) Appl. No.: 14/107,172

(22) Filed: Dec. 16, 2013

(65) Prior Publication Data

US 2014/0181938 A1 Jun. 26, 2014

Related U.S. Application Data

(60) Provisional application No. 61/740,190, filed on Dec. 20, 2012.

(51) Int. Cl.
| | |
|---|---|
| *G06F 17/00* | (2006.01) |
| *H04L 27/20* | (2006.01) |
| *H04L 27/233* | (2006.01) |
| *H04L 29/06* | (2006.01) |

(52) U.S. Cl.
CPC ....... *H04L 27/2003* (2013.01); *H04L 27/2332* (2013.01); *H04L 63/083* (2013.01); *H04L 2463/082* (2013.01)

(58) Field of Classification Search
CPC ............. H04L 63/083; H04L 27/2332; H04L 27/2003; H04L 2463/082
USPC .................................. 700/94; 726/7
See application file for complete search history.

(56) References Cited

U.S. PATENT DOCUMENTS

2013/0212664 A1* 8/2013 Luo ...................... H04W 12/06
726/7

* cited by examiner

*Primary Examiner* — Paul S Kim
(74) *Attorney, Agent, or Firm* — Oblon, McClelland, Maier & Neustadt, L.L.P.

(57) ABSTRACT

Methods and systems for transmitting and receiving data using audio devices but without being detectable by a human ear are disclosed. For example, a device for transmitting data can include a modulator configured to transform digital data into a modulated signal having a frequency no less than about 20 kHz, and an audio transmitter coupled to an output of the modulator configured to transmit the modulated signal into a sound propagating medium without being detected by a human ear. The methods and systems can be used to perform two-factor authentication for permitting a user to access a remote server or other device.

13 Claims, 7 Drawing Sheets

PACKET PROCESSOR VERIFICATION METHODS AND SYSTEMS

INCORPORATION BY REFERENCE

This application claims the benefit of U.S. Provisional Application No. 61/740,190 entitled "Method for data transmission and two-factor authentication using audio signals" filed on Dec. 20, 2012, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computers and processor-based systems, such as smart phones and tablets, often have a need to communicate with one another. Unfortunately, because of hardware compatibility issues, various computers and processor-based devices may not be capable of direct and convenient communication.

SUMMARY

Various aspects and embodiments of the invention are described in further detail below.

In an embodiment, a device for transmitting data includes a modulator configured to transform digital data into a modulated signal having a frequency no less than about 20 kHz, and an audio transmitter coupled to an output of the modulator configured to transmit the modulated signal into a sound propagating medium without being detected by a human ear.

In another embodiment, a method for transmitting data includes transforming digital data into a modulated signal having a frequency no less than about 20 kHz, and transmitting the modulated signal into a sound propagating medium without being detected by a human ear.

In yet another embodiment, a device for receiving data includes an audio transducer configured to receive a modulated signal from a sound propagating medium, the modulated signal not being detectable in any part by a human ear, and a demodulator coupled to the audio transducer and configured to demodulated signals having a frequency no less than about 20 kHz into digital data.

In still another embodiment, a method for receiving data includes receiving a modulated signal from a sound propagating medium, the modulated signal not being detectable in any part by a human ear, and demodulating the modulated signal using a demodulator configured demodulated signals having a frequency no less than about 20 kHz into digital data.

In still another embodiment, a method for performing authentication between a computer and a remote server that includes forwarding a user-entered password from the computer to the remote server via an electronic link, receiving via an ultrasonic link a secondary authentication message generated by the remote server, and forwarding the secondary authentication message to the remote server to enable the remote server to perform a two-factor authentication.

In still another embodiment, a system for performing authentication, includes a computer configured to forward a user-entered password to a remote server via an electronic link, receive via an ultrasonic link a secondary authentication message generated by the remote server, and forward the secondary authentication message to the remote server to enable the remote server to perform a two-factor authentication.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

The methods and systems below are designed to take advantage of standard audio processing hardware ubiquitous in electronics today.

Human ears are capable of detecting frequencies typically in the range of 20 Hz to 20 kHz.

In contrast, most audio recordings and recording chipsets use audio data sampled at 44.1 kHz for a theoretical high frequency of 22.05 kHz according to the Nyquist sampling criterion. This means that, in theory, there is an unused 2.05 kHz of bandwidth between the upper limit of human hearing and the maximum frequency able to be detected/stored in an audio recording. This 2.05 kHz of bandwidth, which is inaudible to humans, can be used for communicating data over short distances over a wide range of electronic devices, including personal and portable computers, smartphones, tablets, and other mobile devices.

Newer chips in developing electronic devices may incorporate higher sampling rates, and therefore expand upon the 22.05 kHz upper range. Accordingly, this disclosure is not to be interpreted as limiting the upper range of available ultrasonic bandwidth. For example, certain chip sets are readily set to a 48, 96 and 192 kHz sampling rates for 24 kHz, 48 kHz and 96 kHz potential audio. Chip sets may easily be set to various sampling increments, for example, of 100 Hz. As a result sound could be created and/or sampled to encompass maximum bandwidths of 22.05 kHz, 22.1 kHz, 22.15 kHz and so on ad infinitum.

Nearly all communications devices contain a speaker for generating sounds, and a microphone for listening to those sounds. By exchanging data over frequencies that can be detected by microphones and generated by speakers, this ensures a highly interoperable communications method between two devices of any kind reducing the need for extra hardware.

Figure 1:
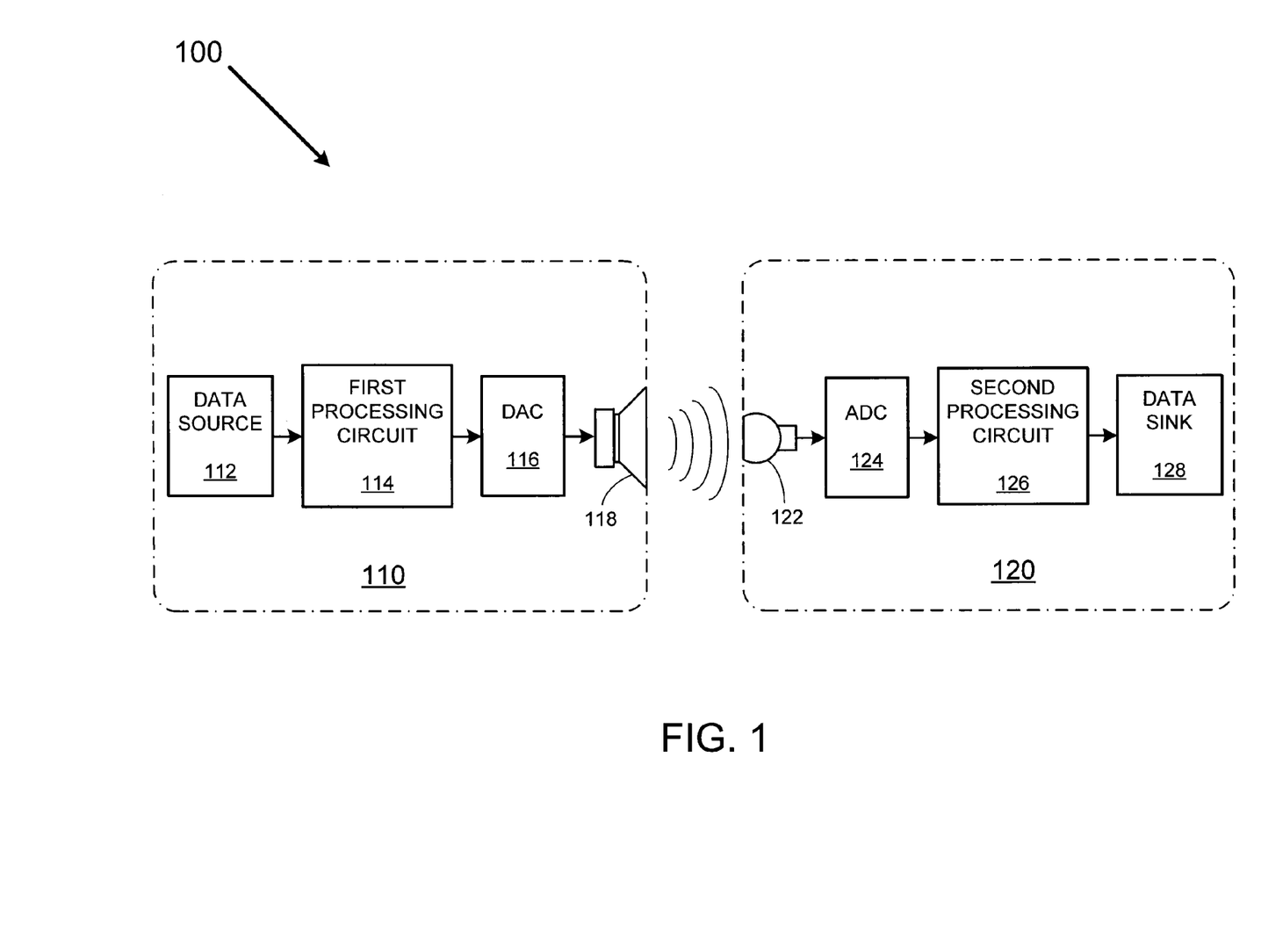
FIG. 1 depicts transmission system whereby a transmitting device transmits digital data to a receiving device via a sound propagating medium using frequencies inaudible to the human ear.

FIG. 1 depicts transmission system 100 whereby a transmitting device 110 transmits digital data to a receiving device 120 via a sound propagating medium using ultrasonic frequencies inaudible to the human ear. The transmitting device 110 includes a data source 112, a first processing circuit 114, a Digital-to-Analog Converter (DAC) 116 and an audio transmitter 118 (e.g., a speaker). The receiving device 120 includes an audio transducer 122 (e.g., a microphone), an Analog-to-Digital Converter (ADC) 124, a second processing circuit 126 and a data sink 128.

The data source 112 can be any viable device or memory capable of supplying data to a digital processing circuit, such as a memory, a transducer or a collection of dedicated logic. Similarly, the data sink 128 can be any device or memory capable of receiving digital data where after such data might be stored or further processed. The first processing circuit 114 and the second processing circuit 126 are envisioned to be microprocessor-controlled devices, such as, but not limited to, ARM processing systems commonly found in cellular phones. However, in other embodiments, the first processing circuit 114 and the second processing circuit 126 can take any number of forms, such as programmable logic arrays and chip sets.

In operation, the first processing circuit 114 receives digital data from the data source 112, then digitally modulates the digital data such that it can be transmitted within a narrow band of discrete frequencies, e.g., no less than about 20 kHz and no more than 22.05 kHz.

As hearing acuity is not constant between different people, the term "about 20 kHz" is as accurate a measure of the lower bound as may be possible. Further, as newer chips in forthcoming electronic devices may incorporate higher sampling rates, the 22.05 kHz upper range can be expanded upon as may be convenient, necessary or otherwise desirable.

Once digitally modulated, the digital data is provided to the DAC 116, which transforms the digital data from digitally modulated form to an analog modulated form in the (human) ultra-sonic region. Thereafter the audio transmitter 118 transmit the analog modulated digital data into a sound propagating medium (e.g., air) without being detected by a human ear in the vicinity of the transmitting device 110.

The receiving device 120 receives the transmitted signal using its an audio transducer 122, which is configured to receive both human audible signals and the ultra-sonic modulated data, and provide an equivalent electrical signal to the ADC 124. The ADC 124 transforms the received signal into digital form where after the digital data is extracted by the processing circuit 126 and deposited into the data sink 128 for storage and/or further processing.

Figure 2:
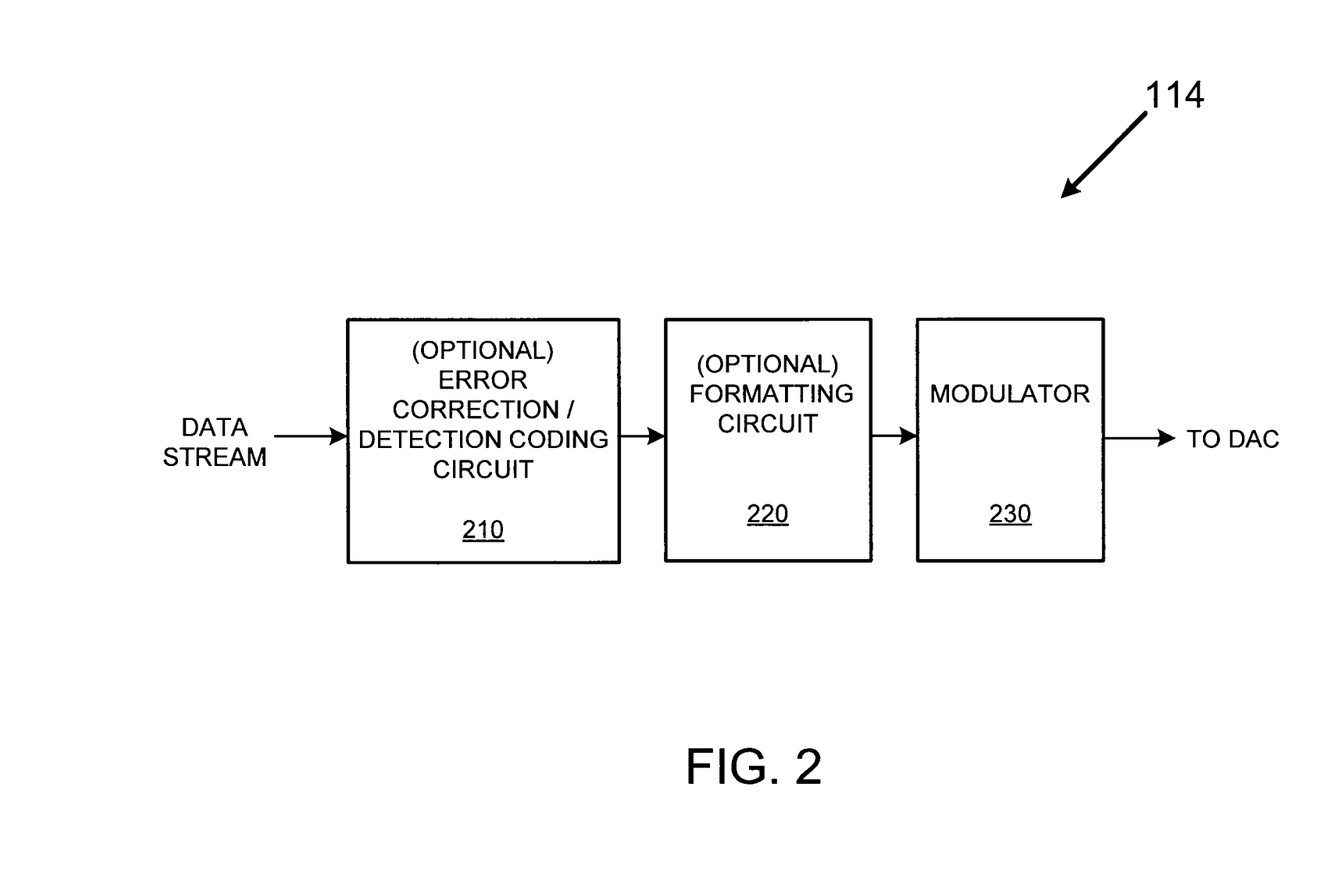
FIG. 2 is an example of the first processing system of FIG. 1.

FIG. 2 is an example of the first processing system 114 of FIG. 1. The exemplary first processing system 114 includes an optional error detection/correction coding (ECC) circuit 210, a formatting circuit 220, and a modulator 230.

In operation, digital data is received by the ECC circuit 210, which optionally encodes the digital data to include redundant data such that errors that occur in transmission can be detected and/or corrected. As error detection and/or error correction schemes are well known, no further discussion will be provided other than an exemplary error detection scheme can be as simple as adding a CRC checksum, or encompass any number of block or convolutional encoding schemes.

The digital data is then optionally processed by the formatter 220, which can, depending on design requirements or preferences, packetize the digital data, add encryption and/or add leading bits that may be useful for performing synchronization and channel estimation at a receiver.

The digital data is then modulated according to any known or later-developed modulation scheme that can possibly modulate the digital data to a form suitable for transmission and yet will not be detected by a human ear. For example, in one embodiment the modulator 230 can be a continuous-phase frequency-shift keying (CPFSK) modulator capable of shifting between two distinct frequencies while maintaining smooth, continuous phase transitions. It is to be appreciated, however, that larger modulation constellations (e.g., multiple bits per symbol) are also envisioned. Additionally, multiple-simultaneous tones may be used to develop communication approaches that resemble or incorporate Dual-Tone Multi-Frequency (DTMF) data transfer or Orthogonal Frequency Division Modulation (ODFM) data transfer. As the basics of CPFSK are well-known, however, further structural details are deemed unnecessary.

Figure 4:
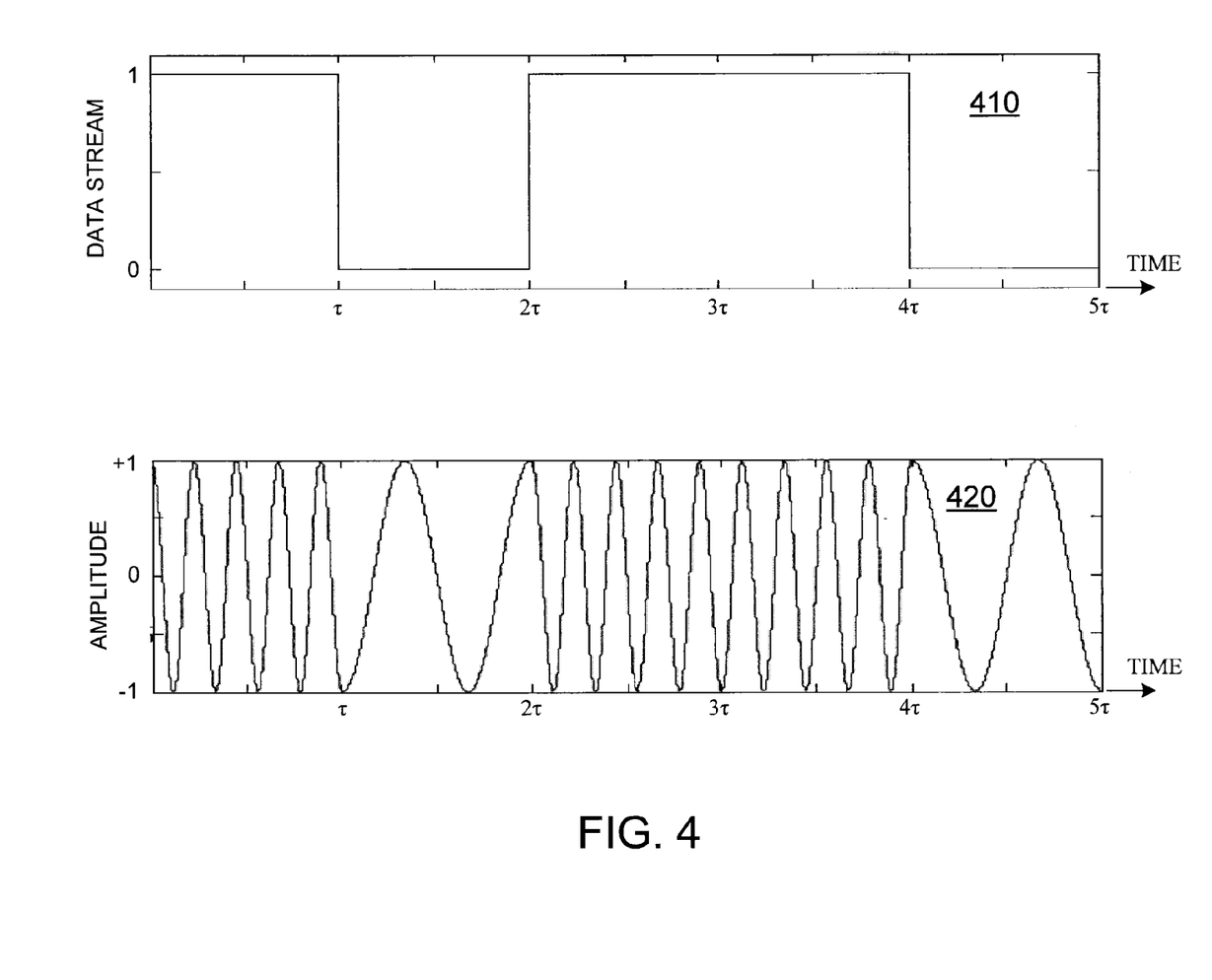
FIG. 4 depicts an example data stream with modulated data usable for the communication system of FIG. 1.

Choosing an appropriate modulation scheme can minimize or eliminate human-perceptible side-effects. The problems of various other modulation schemes, such as Amplitude Shift Keying (ASK) and Phase Shift Keying (PSK), is that they contain odd non-linearities and discontinuities that produce audible "clicks." The phase of regular Frequency Shift Keying (FSK), however, can be made continuous for a smooth shift in frequency, and therefore this technique us useable as a practical alternative. A simple modulator may even be little more than a single Voltage Controlled Oscillator (VCO). FIG. 4 depicts an example of a digital data steam 410 and an equivalent CPFSK modulated signal 420. As can be seen in FIG. 4, a change in digital state does not result in a discontinuous modulated signal.

Figure 3:
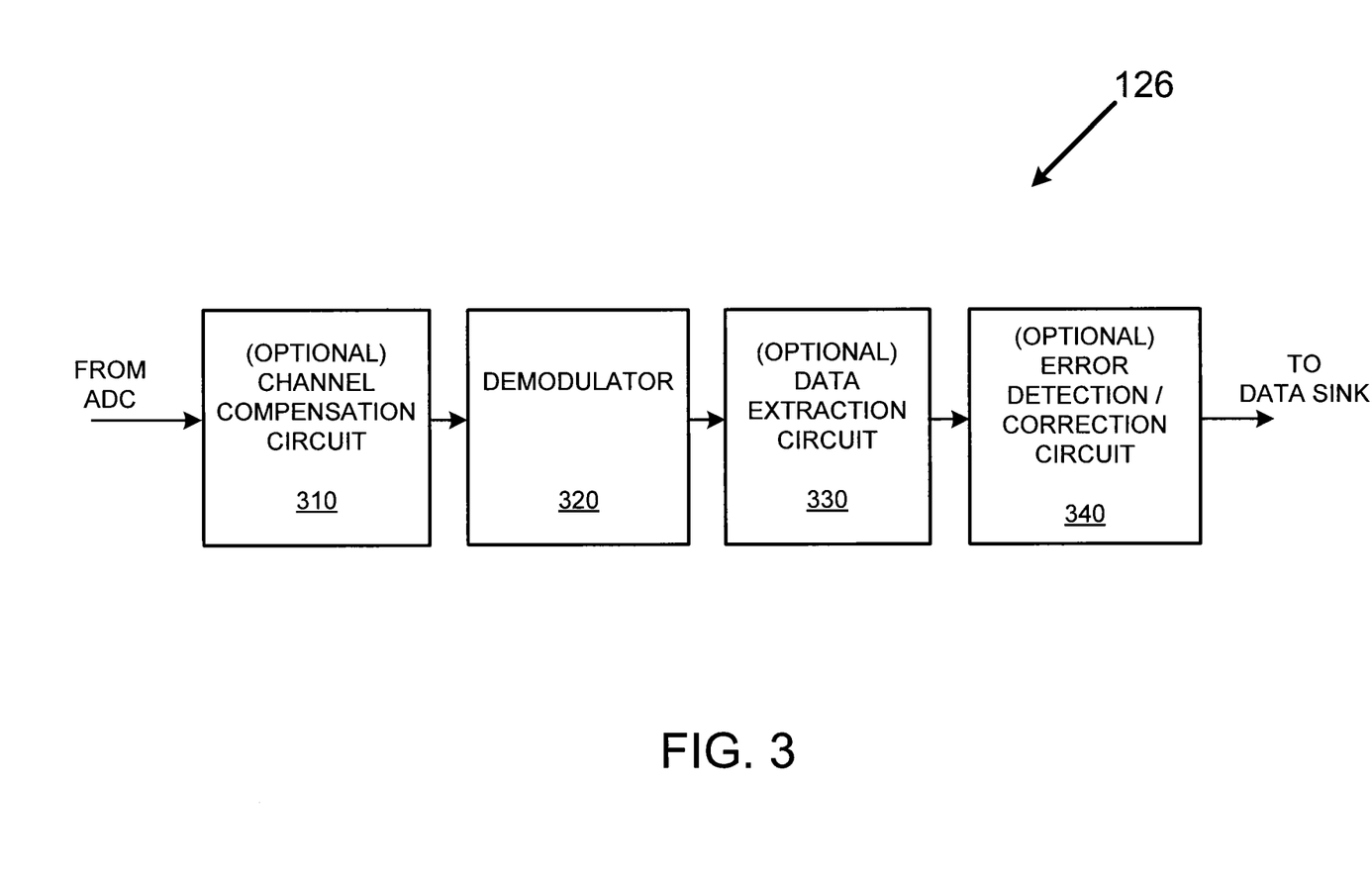
FIG. 3 is an example of the second processing system of FIG. 1.

FIG. 3 is an example of the second processing system 126 of FIG. 1. The second processing system 126 includes an optional channel compensation circuit 310, a demodulator 320, an optional data extraction circuit 330 and an optional error detection/correction circuit 340.

In operation, the channel compensation circuit 310 can be used to compensate for any number of distortions that may be present in a received signal, such as high-frequency signal attenuation, phase distortion and multipath effects. Generally, the channel compensation device 310 can take the form of any number of digital filters and decision devices. However, the exact form of the channel compensation circuit 310 can vary as may be found desirable or advantageous depending on particular design criteria.

After optional compensation, the demodulator 320, which in this case is a CPFSK demodulator, derives estimates of digital data, which are fed to the data extraction circuit 330 such that payload data is separated from ancillary data (e.g., packet headers and synchronization bits). Thereafter, the error detection/correction circuit 340 can detect and/or correct for any errors in the received digital data.

Applications

The above-described methods and systems can be used in a variety of applications, such as authentication. By way of example, if a developer runs Website A, designed and coded it securely, and does the proper procedures with respect to user passwords (e.g., doesn't store the passwords, salts and hashes them), there is still a problem if a user uses the same password on Website B, which does the wrong things with user passwords.

Many times when we hear about "hacking" it's because somebody dumped a password file from a poorly coded site, and used those passwords on a properly coded site. It's a simple fact that people re-use passwords.

This disclosure enables a user to perform two-factor authentication on a website with little to no additional effort beyond typing in the password that would need to be typed anyway. Assuming a user has a mobile phone or similar mobile device which is close to the computer she is using, an audio link (including frequencies inaudible to humans) can be established between the phone and the computer as the second component of two-factor authentication with the first factor being a standard password.

Figure 5:
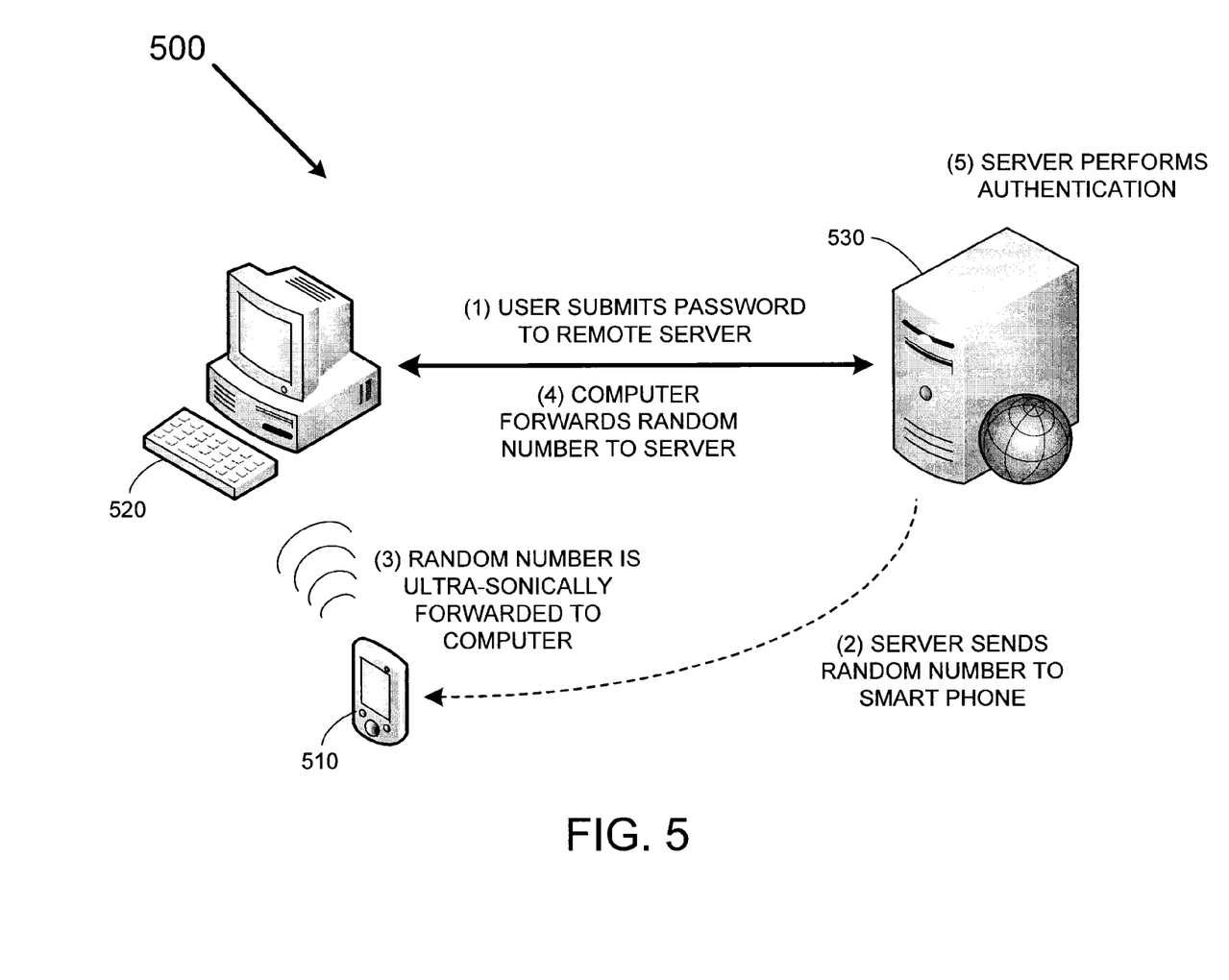
FIG. 5 depicts an exemplary system 500 capable of two-factor authentication.

FIG. 5 depicts an exemplary system 500 capable of two-factor authentication. As shown, the system 500 includes a mobile device 510 (e.g., a smart phone, PDA or tablet), a computer 520 and a remote server 530.

In one example of operation, a user can type in and submit a password to the remote server 530 using the computer 520.

In response, the remote server 530 can generate a random number, and forward the random number to the mobile device 510 via, for example, an SMS message. While the exemplary system incorporates a random number (or pseudo-random number), in practice a wide variety of types of information by be used as a secondary authentication message. Further, a transmission means other than SMS may be used, such as a push notification, email, etc.

It is to be appreciate that for the example of FIG. 5, while the remote server 530 is depicted as generating and sending a random number, in various embodiments any number of intermediate servers (not shown in FIG. 5) may be used to generate the random number and/or generate the SMS message. In such instances, the intermediate servers can be considered part of the remote server 530.

The mobile device 510 then transmits the random number to the computer 520 via an ultrasonic link as disclosed above. In order to accomplish the transmission, the mobile device 510 can incorporate a specially-designed software application to receive the SMS, extract the random number and transmit the random number via a speaker.

On the computer 520, an appropriately configured software application can receive the random number, and transmit it back to the remote server 530 enabling the remote server 530 to confirmed both the password and random number. The result is two-factor authentication without the having to do anything other than (1) type in a password, and (2) place a mobile device near a computer.

Two factor authentication can be used, for example, in a banking application. If a user logs in on a different (or unusual) IP address or using a browser without the expected cookie, the bank will send a text message with a code, and the user can then type in the code into the browser to prove possession of the phone. This has doubled the workload. According to an aspect of the disclosure, however, the user is not required to perform any other tasks in addition to typing in their password as usual. The second component of the two-factor authentication is performed automatically between the phone and the computer via the audio transmission.

According to another aspect of the disclosure, the method does not require a pairing between the two devices (phone and computer) ahead of time, and can use components that already exist in virtually every laptop computer sold today (i.e., a microphone).

Figure 6:
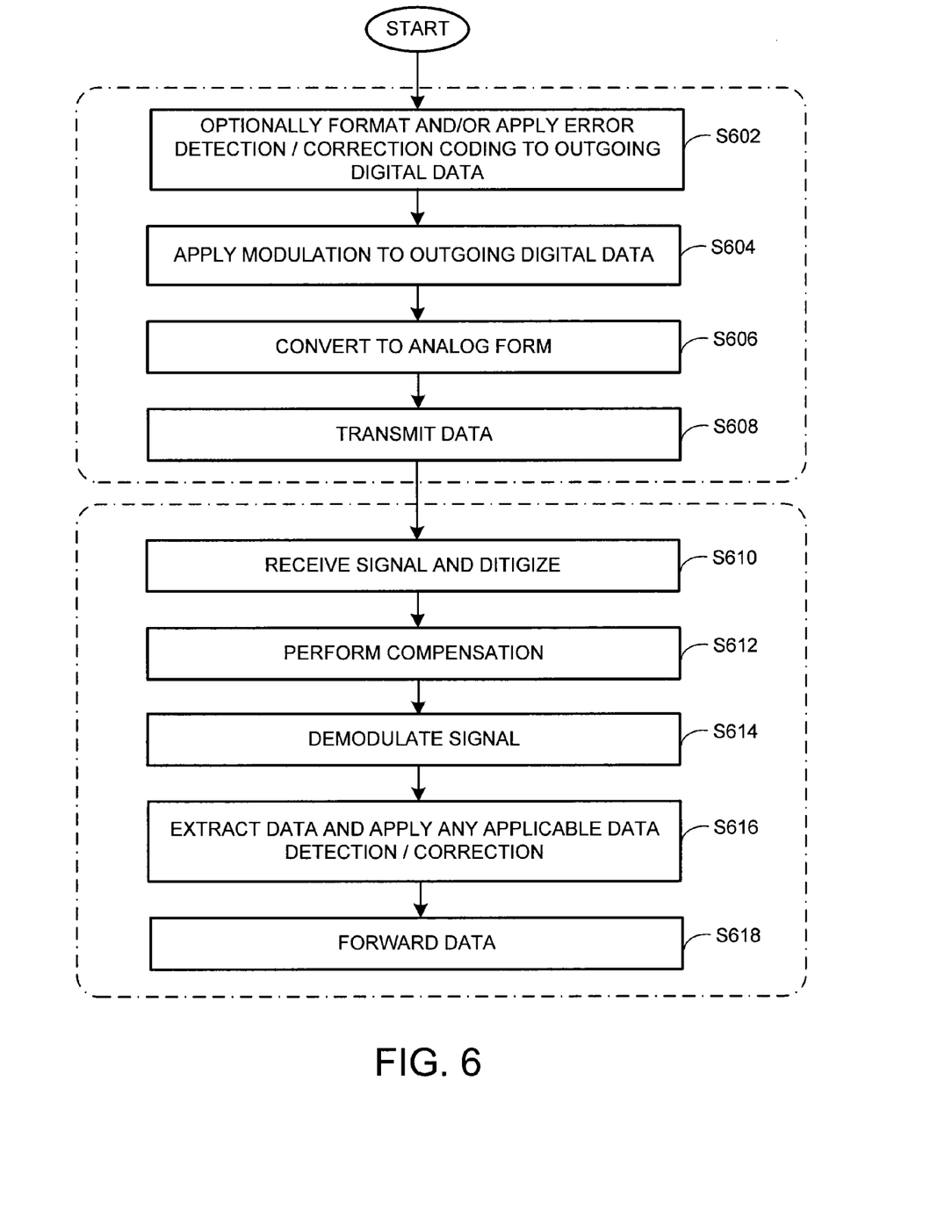
FIG. 6 is a flowchart outlining a set of exemplary operations usable for communicating data.

FIG. 6 is a flowchart outlining a set of exemplary operations usable for communicating data. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S602 where digital data is optionally formatted (encrypted, packetized, etc.) and error correction and detection coding applied. Next, in step S604 an appropriate modulation scheme, such as any of the CPFSK modulation schemes discussed above, can be applied to the outgoing digital data. Then, in step S606 the outgoing signal containing the digital data is converted from digital to analog form, and in step S608 the digital data is transmitted to a receiving device.

In step S610, the transmitted data of step S608 is received and digitized. Next, in step S612, any number of compensation processes can be applied as is discussed above. Then in step S614, the received digital signal is demodulated according to a CPFSK or other suitable technique. Control continues to step S616.

In step S616, the payload digital data is extracted from whatever ancillary data, e.g., packet headers and synchronization bits, and error detection and/or correction is applied. Then, in step S618, the extracted and corrected data is forwarded for storage of further processing.

Figure 7:
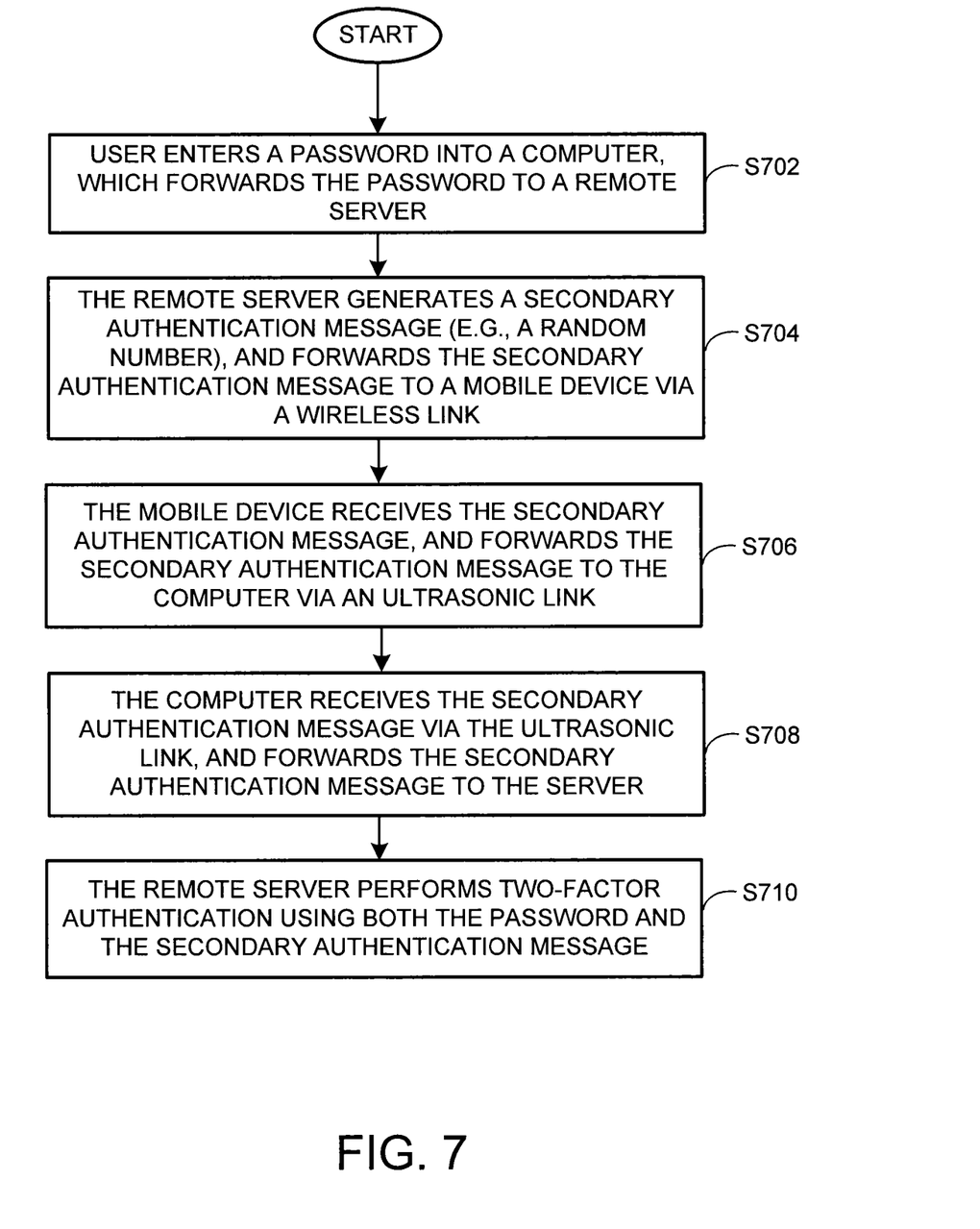
FIG. 7 is a flowchart outlining a set of exemplary operations usable for two-part authentication.

FIG. 7 is a flowchart outlining a set of exemplary operations usable for authenticating a user. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S702 where a user can type in and submit a password to a computer, which forwards/submits the password to a remote server. Next, in step S704, in response to receiving the password the remote server generates a secondary authentication message (e.g., a random number) and forwards the secondary authentication message wirelessly to a mobile device via an SMS or other type message. Then, in step S706, the mobile device receives the secondary authentication message, then transmits the secondary authentication message to the computer of step S702 via an ultrasonic link as disclosed above. Control continues to step S708.

In step S708, the computer receives the secondary authentication message via the wireless link, then forwards the secondary authentication message to the remote server. This allows the remote server in step S710 to perform a two-factor authentication using the user-supplied password and the secondary authentication message.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A device for transmitting data, comprising:
   a coding circuit that embeds error correction and/or detection codes into digital data;
   a continuous-phase frequency shift keying modulator configured to transform digital data including the error correction and/or detection codes into a modulated signal having a frequency no less than about 20 kHz; and
   an audio transmitter coupled to an output of the modulator configured to transmit the modulated signal into a sound propagating medium without being detected by a human ear.

2. The device of claim 1, further comprising a formatting device that arranges the digital data into a packet form before the modulator modulates the digital data.

3. The device of claim 1, wherein the modulator is configured to transform digital data into a modulated signal having a frequency no less than about 20 kHz and no more than 22.05 kHz.

4. The device of claim 1, wherein an audio transmitter is a speaker and the sound propagating medium is air.

5. A method for transmitting data, comprising:
   embedding error correction and/or detection codes into digital data before modulating the digital data;
   transforming the embedded digital data into a modulated signal using a continuous-phase frequency shift keying modulation technique having a frequency no less than about 20 kHz; and
   transmitting the modulated signal into a sound propagating medium without being detected by a human ear.

6. The method of claim 5, wherein a frequency range of the modulated signal has a higher limit of 22.05 kHz.

7. A device for receiving data, comprising:
   an audio transducer configured to receive a modulated signal from a sound propagating medium, the modulated signal not being detectable in any part by a human ear;
   a continuous-phase frequency shift keying demodulator coupled to the audio transducer and configured to demodulated signals having a frequency no less than about 20 kHz into digital data; and
   an error detection and/or correction circuit that detects errors in the digital data.

8. The device of claim 7, further comprising a data extraction device that extracts the digital data from packet form.

9. The device of claim 7, wherein the demodulator is configured to demodulated signals having a frequency no less than about 20 kHz and no more than 22.05 kHz into digital data.

10. The device of claim 7, further comprising a channel compensation circuit that compensates for channel distortion between a transmitter and the audio transducer.

11. A method for receiving data, comprising:
    receiving a modulated signal from a sound propagating medium, the modulated signal not being detectable in any part by a human ear, and
    demodulating the modulated signal using a continuous-phase frequency shift keying demodulator configured demodulated signals having a frequency no less than about 20 kHz into digital data;
    detecting errors in the digital data.

12. The method of claim 11, further comprising compensating for channel distortion between a transmitter and an audio transducer receiving a modulated signal.

13. The method of claim 11, wherein the demodulated signals have a frequency no less than about 20 kHz and no more than 22.055 kHz.

* * * * *